(12) United States Patent
Aten et al.

(10) Patent No.: US 10,968,864 B2
(45) Date of Patent: Apr. 6, 2021

(54) NACELLE

(71) Applicant: Rohr, Inc., Chula Vista, CA (US)

(72) Inventors: Michael Ray Aten, San Diego, CA (US); Sara Crawford, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 16/553,939

(22) Filed: Aug. 28, 2019

(65) Prior Publication Data
US 2019/0383233 A1 Dec. 19, 2019

Related U.S. Application Data

(63) Continuation of application No. 16/017,774, filed on Jun. 25, 2018, now Pat. No. 10,436,150, which is a continuation of application No. 15/702,424, filed on Sep. 12, 2017, now Pat. No. 10,030,607, which is a continuation of application No. 14/939,638, filed on Nov. 12, 2015, now Pat. No. 9,784,216, which is a
(Continued)

(51) Int. Cl.
| | |
|---|---|
| *F02K 1/82* | (2006.01) |
| *F02K 1/72* | (2006.01) |
| *F02K 1/56* | (2006.01) |
| *B64D 29/02* | (2006.01) |
| *B64D 33/04* | (2006.01) |
| *F02K 1/54* | (2006.01) |

(52) U.S. Cl.
CPC ................ *F02K 1/82* (2013.01); *B64D 29/02* (2013.01); *B64D 33/04* (2013.01); *F02K 1/54* (2013.01); *F02K 1/566* (2013.01); *F02K 1/72* (2013.01); *F05D 2220/36* (2013.01); *Y02T 70/50* (2013.01)

(58) Field of Classification Search
CPC ... F02K 1/82; F02K 1/54; F02K 1/566; F02K 1/72; B64D 29/02; B64D 33/04; F05B 2220/33; F05D 2220/36; Y02T 70/56
See application file for complete search history.

(56) References Cited

U.S. PATENT DOCUMENTS

| | | |
|---|---|---|
| 3,960,345 A | 6/1976 | Lippert, Jr. |
| 4,147,028 A | 4/1979 | Rodgers |

(Continued)

FOREIGN PATENT DOCUMENTS

| | | |
|---|---|---|
| CN | 101410294 | 4/2009 |
| EP | 2620627 | 7/2013 |

OTHER PUBLICATIONS

Office Action dated Mar. 28, 2017 in Chinese Application No. 201310032243.9.
(Continued)

*Primary Examiner* — Benjamin P Lee
(74) *Attorney, Agent, or Firm* — Snell & Wilmer L.L.P.

(57) ABSTRACT

A nacelle is configured to be coupled to an underside of a wing and forms a clearance space between the nacelle and a leading edge slat of the wing. A portion of an outlet cowling moves longitudinally aft when a reverse thrust configuration is activated and the leading edge slat is deployed toward the nacelle. The outlet cowling also includes another portion located adjacent to the leading edge slat that does not move when the reverse thrust configuration is activated and thus maintains its clearance space from the leading edge slat.

20 Claims, 14 Drawing Sheets

Related U.S. Application Data continuation of application No. 14/590,668, filed on Jan. 6, 2015, now Pat. No. 9,228,532, which is a continuation of application No. 14/246,352, filed on Apr. 7, 2014, now Pat. No. 8,931,736, which is a continuation of application No. 13/410,933, filed on Mar. 2, 2012, now Pat. No. 8,727,275.

(60) Provisional application No. 61/591,715, filed on Jan. 27, 2012.

(56) References Cited

U.S. PATENT DOCUMENTS

| | | |
|---|---|---|
| 4,449,683 A | 5/1984 | Gratzer et al. |
| 4,799,633 A | 1/1989 | Lahti et al. |
| 5,035,379 A | 7/1991 | Hersen et al. |
| 5,228,641 A | 7/1993 | Remlaoui |
| 5,443,230 A | 8/1995 | Lord et al. |
| 5,863,014 A | 1/1999 | Standish |
| 6,170,253 B1 | 1/2001 | Newton |
| 6,340,135 B1 | 1/2002 | Barton |
| 6,584,763 B2 | 7/2003 | Lymons et al. |
| 6,966,524 B2 | 11/2005 | Stuhr |
| 7,090,165 B2 | 8/2006 | Jones et al. |
| 7,484,356 B1 | 2/2009 | Lair |
| 8,109,466 B2 | 2/2012 | Aten et al. |
| 8,127,532 B2 | 3/2012 | Howe |
| 8,316,632 B2 | 11/2012 | West et al. |
| 8,402,765 B2 | 3/2013 | Amkraut et al. |
| 8,505,307 B2 | 8/2013 | Wang |
| 8,511,062 B2 | 8/2013 | Ramlaoui et al. |
| 8,528,857 B2 | 9/2013 | Hillereau et al. |
| 8,727,275 B2 | 5/2014 | Aten |
| 8,931,736 B2 | 1/2015 | Aten |
| 9,228,532 B2 | 1/2016 | Aten |
| 9,784,216 B2 | 10/2017 | Aten |
| 10,030,607 B2 | 7/2018 | Aten |
| 2005/0056726 A1* | 3/2005 | Mayes .............. B64D 29/06 244/54 |
| 2009/0314887 A1 | 12/2009 | Aten et al. |
| 2010/0001123 A1 | 1/2010 | Hillereau et al. |
| 2010/0031630 A1 | 2/2010 | Bulin et al. |
| 2010/0126139 A1 | 5/2010 | Howe |
| 2010/0132332 A1 | 6/2010 | Vauchel |
| 2010/0270428 A1 | 10/2010 | Murphy |
| 2010/0287910 A1 | 11/2010 | Joret et al. |
| 2011/0277448 A1 | 11/2011 | Roberts |
| 2011/0296813 A1 | 12/2011 | Frank et al. |
| 2012/0217320 A1 | 8/2012 | Vauchel et al. |
| 2013/0075492 A1 | 3/2013 | Welch et al. |
| 2013/0280052 A1 | 10/2013 | Aircelle |
| 2014/0246514 A1 | 9/2014 | Gukeisen et al. |
| 2016/0061147 A1 | 3/2016 | Aten et al. |

OTHER PUBLICATIONS

Extended European Search Report dated May 4, 2017 in European Application No. 12192641.4.
Office Action dated Oct. 9, 2016 in Chinese Application No. 201310032243.9.
Second Office Action dated Mar. 14, 2016 in Chinese Application No. 201310032243.9.
USPTO; Non-Final Office Action dated Sep. 27, 2013 in U.S. Appl. No. 13/410,933.
USPTO; Notice of Allowance dated Jan. 8, 2014 in U.S. Appl. No. 13/410,933.
USPTO; Office Action dated Jul. 2, 2014 in U.S. Appl. No. 14/246,352.
USPTO; Notice of Allowance dated Sep. 15, 2014 in U.S. Appl. No. 14/246,352.
State Intellectual Property Office, P.R. China, First Office Action, dated Aug. 3, 2015 in Patent Application No. 201310032243.9.
USPTO; Pre Interview First Office Action dated Aug. 3, 2015 in U.S. Appl. No. 14/590,668.
USPTO; Notice of Allowance dated Oct. 13, 2015 in U.S. Appl. No. 14/590,668.
USPTO; Non-Final Office Action dated Dec. 21, 2015 in U.S. Appl. No. 14/939,638.
USPTO; Final Office Action dated Apr. 8, 2016 in U.S. Appl. No. 14/939,638.
USPTO; Advisory Action dated Jun. 13, 2016 in U.S. Appl. No. 14/939,638.
USPTO; Non-Final Office Action dated Aug. 24, 2016 in U.S. Appl. No. 14/939,638.
USPTO; Final Office Action dated Feb. 16, 2017 in U.S. Appl. No. 14/939,638.
USPTO; Advisory Action dated Apr. 21, 2017 in U.S. Appl. No. 14/939,638.
USPTO; Notice of Allowance dated Jun. 8, 2017 in U.S. Appl. No. 14/939,638.
USPTO; Non-Final Office Action dated Nov. 16, 2017 in U.S. Appl. No. 15/702,424.
USPTO; Notice of Allowance dated Mar. 26, 2018 in U.S. Appl. No. 15/702,424.
European Patent Office, European Office Action dated Apr. 3, 2019 in Application No. 12192641.4.
Canadian Intellectual Property Office, Canadian Office Action dated Oct. 3, 2018 in Application No. 2,800,590.
USPTO; Non-Final Office Action dated Aug. 10, 2018 in U.S. Appl. No. 16/017,774.
USPTO; Final Office Action dated Feb. 21, 2019 in U.S. Appl. No. 16/017,774.
USPTO; Advisory Action dated May 1, 2019 in U.S. Appl. No. 16/017,774.
USPTO; Notice of Allowance dated May 28, 2019 in U.S. Appl. No. 16/017,774.
Candadian Intellectual Prpoerty Office, Canadian Office Action dated Jul. 22, 2019 in Application No. 2,800,590.

* cited by examiner

NACELLE

CROSS-REFERENCE TO RELATED APPLICATIONS

This application is a continuation of, claims priority to and the benefit of, U.S. Ser. No. 16/017,774 filed Jun. 25, 2018 and entitled "NACELLE." The '774 application is a continuation of, claims priority to and the benefit of, U.S. Ser. No. 15/702,424 filed Sep. 9, 2017 and entitled "NACELLE", which issued as U.S. Pat. No. 10,030,607 on Jul. 24, 2018. The '424 application is a continuation of, claims priority to and the benefit of, U.S. Ser. No. 14/939,638 filed Nov. 12, 2015 and entitled "NACELLE" which issued as U.S. Pat. No. 9,784,216 on Oct. 10, 2017. The '638 application is a continuation of, claims priority to and the benefit of, U.S. Ser. No. 14/590,668 filed Jan. 6, 2015 and entitled "NACELLE" which issued as U.S. Pat. No. 9,228,532 on Jan. 5, 2016. The '668 application is continuation of, claims priority to and the benefit of, U.S. Ser. No. 14/246,352 filed Apr. 7, 2014 and entitled "NACELLE" which issued as U.S. Pat. No. 8,931,736 on Jan. 13, 2015. The '352 application is a continuation of, claims priority to and the benefit of, U.S. Ser. No. 13/410,933 filed Mar. 2, 2012 and entitled "NACELLE," which issued as U.S. Pat. No. 8,727,275 on May 20, 2014. The '933 application claims priority to and the benefit of U.S. Provisional Application No. 61/591,715, filed Jan. 27, 2012. All of the above referenced applications are hereby incorporated by reference in their entirety.

FIELD OF INVENTION

This application relates generally to engine nacelles, and, more particularly, to engine nacelle thrust reversers.

DESCRIPTION OF THE RELATED ART

A nacelle is a casing or housing that holds an engine and/or other equipment on an aircraft. Nacelles are commonly coupled to an underside of a wing, for example, by a pylon. Nacelles often include thrust reversers designed to decelerate the aircraft, usually just after touchdown. In conjunction with this, wing slats, when in a deployed position, provide for greater lift when the aircraft is flying slowly. Thrust reverser systems often include cowlings that move aft when the reverse thrust is selected. Additionally, the leading edge of the wing, located above the nacelle, often includes leading edge slats that can be deployed in a direction generally forward and downward, toward the nacelle. In large diameter turbofan engines installed under a wing constrained in its distance from the ground, designs must be carefully engineered so that movement of the cowling and leading edge slats during reverse thrust does not cause the cowling to collide or otherwise interfere with the deployed leading edge slat. The present inventions satisfy this requirement.

SUMMARY

The devices, systems, and methods of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description," one will understand how the features of this invention provide several advantages over existing thrust reversers.

One aspect is a nacelle outlet cowling of a jet engine thrust reverser. The outlet cowling has a circumference measured from an outboard top edge to an inboard top edge. The outlet cowling includes a sliding portion beginning at the inboard top edge and having a circumference that is less than the circumference of the outlet cowling. The sliding portion is configured to move longitudinally between a forward thrust position adjacent to a nacelle inlet cowling and a reverse thrust position aft of the forward thrust position. The outlet cowling further includes at least one stationary portion extending between the outboard top edge and an edge of the sliding portion. The at least one stationary portion remains in a stationary position when the sliding portion moves between the forward thrust position and the reverse thrust position.

Another aspect is a nacelle configured to be coupled to an underside of a wing via a pylon. The wing comprises a leading edge slat configured to extend toward the nacelle when in a deployed configuration. The nacelle includes a cowling having an outer translating sleeve configured to move aft in a longitudinal direction and an outer fixed structure having a clearance distance to the leading edge slat when the leading edge slat is in the deployed configuration that remains substantially constant when the outer translating sleeve moves aft in the longitudinal direction.

Yet another aspect is a method of reversing thrust of an engine fitted with a nacelle on an aircraft. The nacelle comprises a cowling that includes an outer translating sleeve and an outer fixed structure located adjacent to an inboard lateral side of the outer translating sleeve. The method includes moving the outer translating sleeve longitudinally from a first position to a second position aft of the first position without moving the outer fixed structure.

Further aspects, features, and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention. The various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process.

DETAILED DESCRIPTION

The following detailed description is directed to certain specific embodiments of the invention. However, the invention can be embodied in a multitude of different ways as defined and covered by the claims. In this description, reference is made to the drawings wherein like parts are designated with like numerals throughout.

The skilled artisan will recognize the interchangeability of various features from different embodiments. Although these techniques and systems have been disclosed in the context of certain embodiments and examples, it will be understood by those skilled in the art that these techniques and systems may be extended beyond the specifically disclosed embodiments to other embodiments and/or uses and obvious modifications and equivalents thereof. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the systems disclosed herein should not be limited by the particular disclosed embodiments described above.

Embodiments of the invention disclosed herein relate to nacelles that incorporate a sleeve having a translating portion that moves when reverse thrust is engaged, and a fixed portion that remains stationary and does not move when reverse thrust is engaged. Such sleeves do not collide or otherwise interfere with leading edge slat located on a leading edge of the wing above the nacelle when the slat moves downward towards the nacelle during flight. Nacelles disclosed herein can be located closer to the wing, which increases the clearance between the nacelle and the tarmac or runway. This shift allows the fitting of engines that have a higher bypass ratio (larger maximum diameter) to a wing while maintaining the necessary clearance between the bottom of the nacelle and the tarmac or runway. In some implementations, providing a higher bypass ratio engine can reduce thrust specific fuel consumption for an aircraft and improve overall fuel efficiency. Hence, the nacelles disclosed herein can provide several advantages over existing nacelles.

Figure 1:
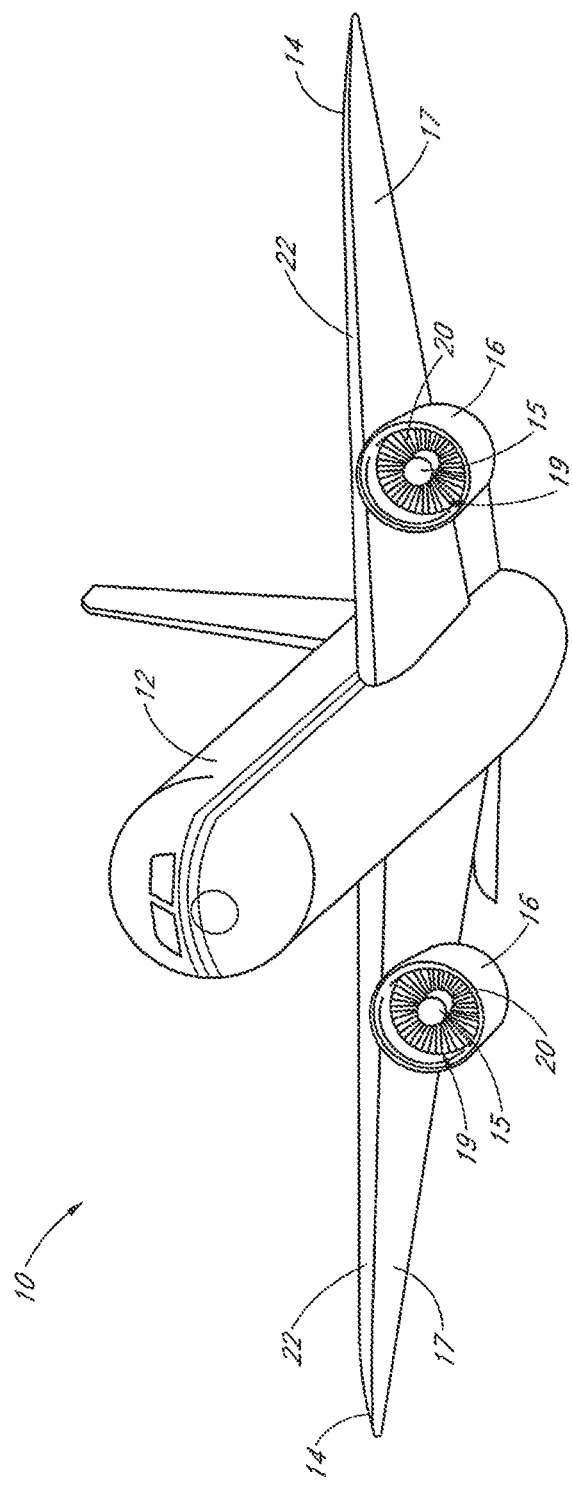
FIG. 1 is a perspective view of an aircraft incorporating a nacelle according to one embodiment of the present invention.

FIG. 1 is a perspective view of an aircraft 10 having a fuselage 12 and a pair of wings 14 extending laterally from the fuselage 12. A nacelle 16 is coupled to an underside of each wing 14. Although not illustrated in FIG. 1, in some embodiments, each nacelle 16 is coupled to a wing by a pylon, or any other suitable structure capable of coupling a load to a wing.

Each nacelle 16 houses an aircraft engine 15, for example, a high bypass ratio engine, which receives air through a fan 20 disposed near an inlet 19 of the nacelle 16, combusts the received air with fuel within a combustion chamber, and provides an exhaust jet through a rear-facing nozzle to propel the aircraft 10 in a forward direction. Additionally, high bypass ratio engines also receive a substantial amount of air through the inlet 19 of the nacelle 16 that is passed over or bypasses the engine 15 to provide additional thrust. The bypass air is combined with the exhaust jet and improves fuel efficiency and reduces engine noise. Because a high bypass ratio engine can require a substantial amount of clearance between an exterior surface of the engine 15 and the interior surface of the nacelle 16, such engines can require a larger nacelle that must be disposed near the underside 17 of the wing 14 in order to provide for necessary clearance between the nacelle and a landing surface such as a runway.

Figure 2:
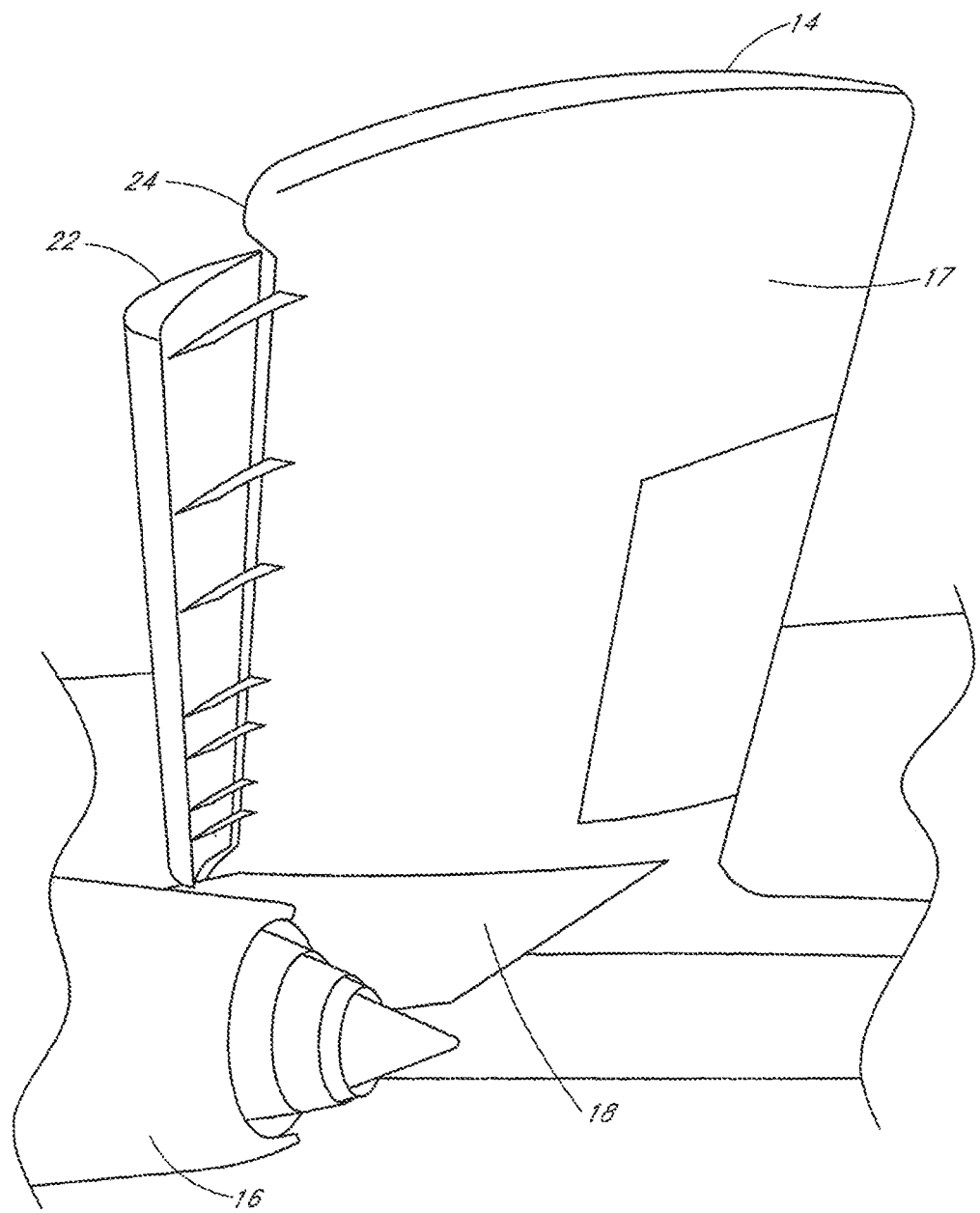
FIG. 2 is a perspective view of an underside of a wing of the aircraft of FIG. 1.

FIG. 2 is a perspective view of the underside 17 of the wing 14. The nacelle 16 is coupled to the wing 14 by a pylon 18. The wing 14 includes slats 22 on the leading edge 24 of the wing 14. Slats 22 are aerodynamic surfaces which, when in a deployed configuration illustrated in FIG. 2, can allow the wing 14 to operate at a higher angle of attack. A higher angle of attack can allow the aircraft 10 to fly more slowly or take off and land in a shorter distance. The leading edge slats 22 can also be deployed after landing to increase drag, thus helping to decelerate the aircraft 10 more quickly. Deploying leading edge slats 22 after landing can thus reduce wear on the brakes and allow for shorter landing distances. The leading edge slats 22 are normally retracted during normal flight operations to minimize drag. The retracted position is illustrated in FIG. 1, for example.

To assist in the description of the nacelles described below with reference to the figures, the following coordinate terms are used, consistent with the coordinate axes illustrated. A "longitudinal axis" is generally parallel to an axis of the nacelle that extends between the inlet and outlet of the nacelle. A "lateral axis" is normal to the longitudinal axis and is generally parallel to a wing associated with the nacelle. A "transverse axis" extends normal to both the longitudinal and lateral axes. In addition, as used herein, "the longitudinal direction" refers to a direction substantially parallel to the longitudinal axis; "the lateral direction" refers to a direction substantially parallel to the lateral axis; and "the transverse direction" refers to a direction substantially parallel to the transverse axis. The terms "upper," "lower," "top," "bottom," "underside," "upperside" and the like, which may be used to describe nacelles and related components in the discussion below, are used in reference to the illustrated orientation of embodiments. For example, the term "upperside" is used to describe the portion of a nacelle that is disposed above an engine housed within the nacelle. The term "underside" is used to describe the portion of the nacelle that is located below the plane formed by the longitudinal and the lateral axes of the nacelle. Additionally, the term "forward" may be used to describe the portion of a nacelle located near the inlet of the nacelle. A first component disposed forward of a second component is generally located further away from a plane formed by the transverse and lateral axes of the nacelle than the second component. The "forward direction" refers to a direction substantially parallel to the longitudinal axis and generally moving from the outlet to the inlet of the nacelle. The term "aft" may be used to describe the portion of a nacelle located near the outlet of the nacelle. A first component disposed aft of a second component is generally located further away from the plane formed by the transverse and lateral axes of the nacelle than the second component. The "aft direction" refers to a direction substantially parallel to the longitudinal axis and generally moving from the inlet to the outlet of the nacelle. A first component disposed "inboard" of a second component is generally closer to the fuselage of an aircraft than the second component. A first component disposed "outboard" of a second component is generally further away from the fuselage than the second component.

Figure 3:
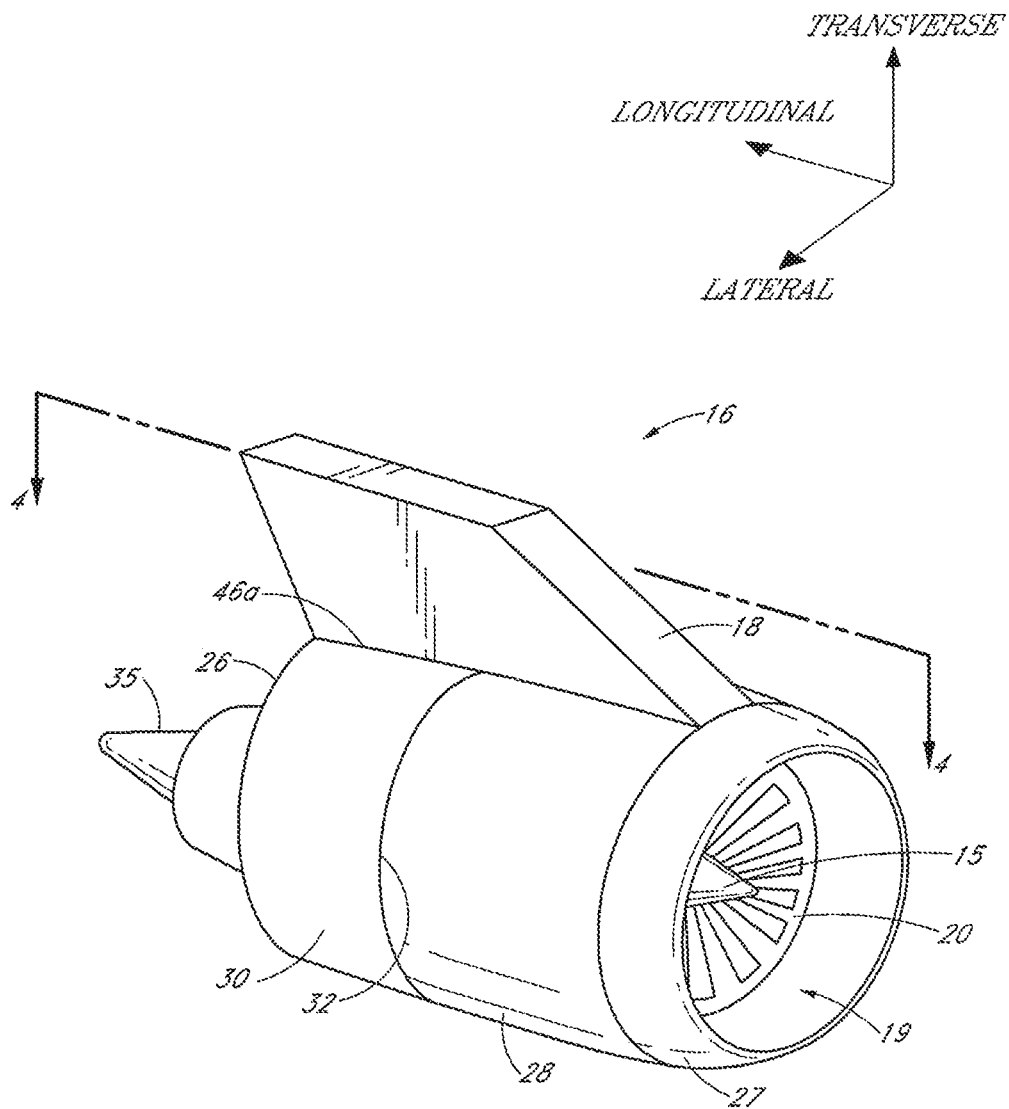
FIG. 3 is a perspective view of the nacelle of FIG. 1 in a forward thrust configuration.
Figure 4:
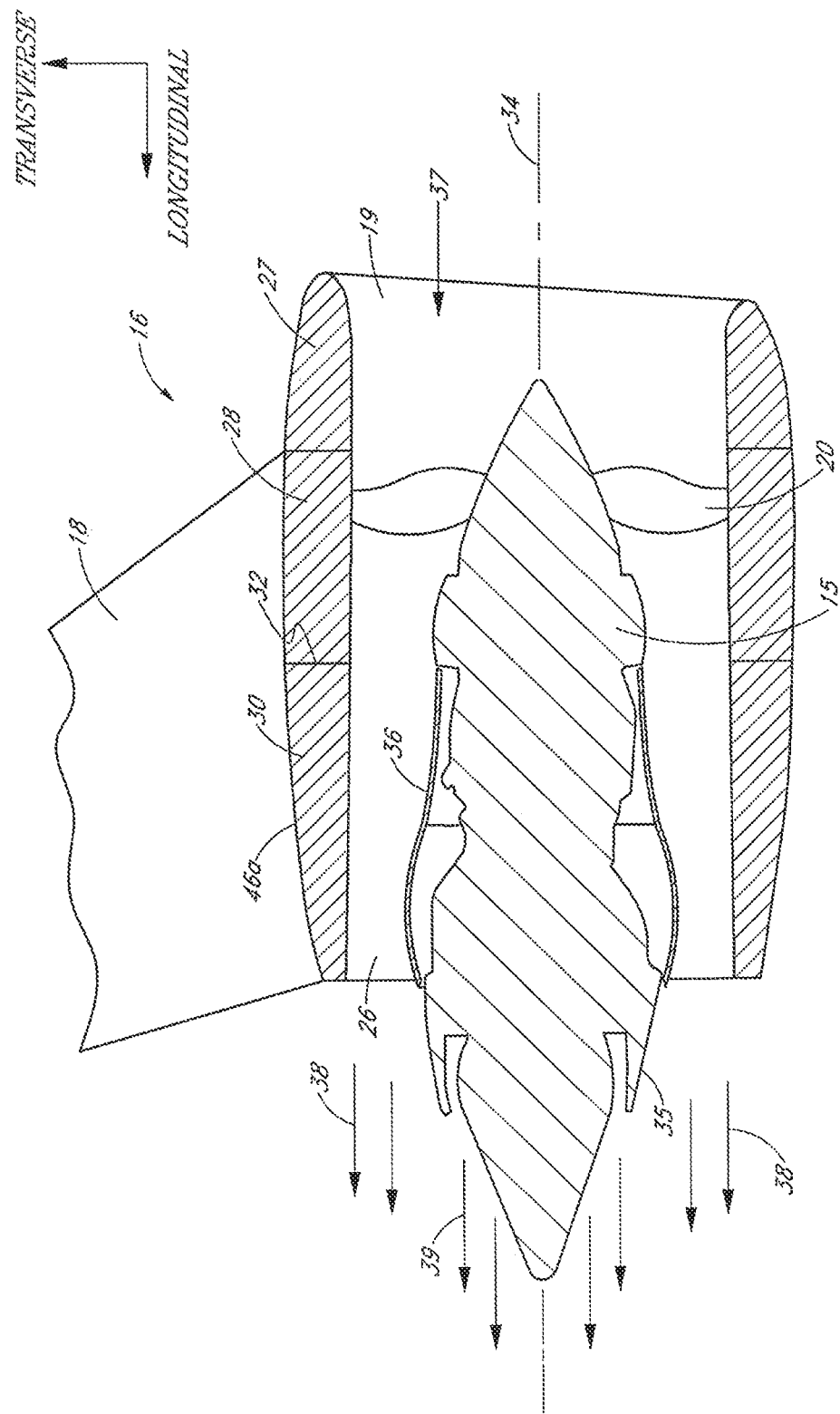
FIG. 4 is a cross-sectional view through the nacelle of FIG. 3 taken along line 4-4.

FIG. 3 illustrates a perspective side view of the nacelle 16 and the engine 15 housed in the nacelle 16. FIG. 4 shows a cross-sectional view of the nacelle 16 and the engine 15 taken along line 4-4 of FIG. 3. The engine 15 includes the fan 20 that is disposed near the front of the nacelle 16 to draw air into the nacelle through the inlet 19. A portion of the air drawn in through the inlet 19 is expelled through an outlet 26 of the nacelle 16 and another portion is combusted with fuel to provide a forward thrust for the aircraft 10. Additionally, air can be expelled through a thrust reverser arrangement, described in greater detail below with reference to FIGS. 5 and 6, to produce a reverse thrust. The nacelle 16 can be coupled to the aircraft 10 by the pylon 18 disposed on the upperside of the nacelle 16. For example, the nacelle 16 can be coupled to the underside of the aircraft wing 14 such that the engine 15 provides forward and reverse thrust capabilities to the aircraft 10.

Still referring to FIGS. 3 and 4, the nacelle 16 includes an inlet lip or noselip 27 and an inlet cowling 28. The noselip 27 and the inlet cowling 28 can together define the inlet 19. The nacelle 16 also includes an outlet cowling 30 disposed aft of the inlet cowling 26. The outlet cowling 30 can define the outlet 26 of the nacelle 16. The inlet cowling 28 and the outlet cowling 30 can come together at splits, or junctures, of the nacelle 16. For example, the nacelle 16 can include a transverse split 32 disposed between the inlet cowling 28 and the outlet cowling 30.

The engine 15 extends along a longitudinal axis 34 of the nacelle 16. The engine 15 includes an exhaust nozzle 35 that extends through the outlet 26 of the nacelle 16. Different components and compartments of the engine, e.g., a combustion chamber, may be housed within one or more engine cowlings 36 that define an outer surface of the engine 15.

As schematically illustrated in FIG. 4, the fan 20 acts to draw incoming air 37 into the nacelle 16 through the inlet 19. A portion of the incoming air 37 may be diverted into the engine 15 and used for combustion while another portion 38 of the drawn-in air 37 may bypass the engine 15 and pass over the engine cowling 36. Thus, bypass air 38 may exit the outlet 26 along with a flow of engine exhaust 39 to provide a forward thrust relative to the nacelle 16 (e.g., to provide a force that thrusts the nacelle 16 and its associated engine 15 and aircraft 10 from left to right as illustrated in FIGS. 3 and 4).

The nacelle 16 can include a thrust reverser system to temporarily divert the bypass air 38, so that the thrust produced by the bypass air 38 is forward, rather than aft. This diversion of air acts against the forward travel of the aircraft 10, decelerating the aircraft. Exhaust air can be redirected using blocker doors and cascade vanes disposed inside the nacelle 16, using mechanisms well known in the art. Reverse thrust is typically applied just after landing, to decelerate the aircraft 10.

Figure 5:
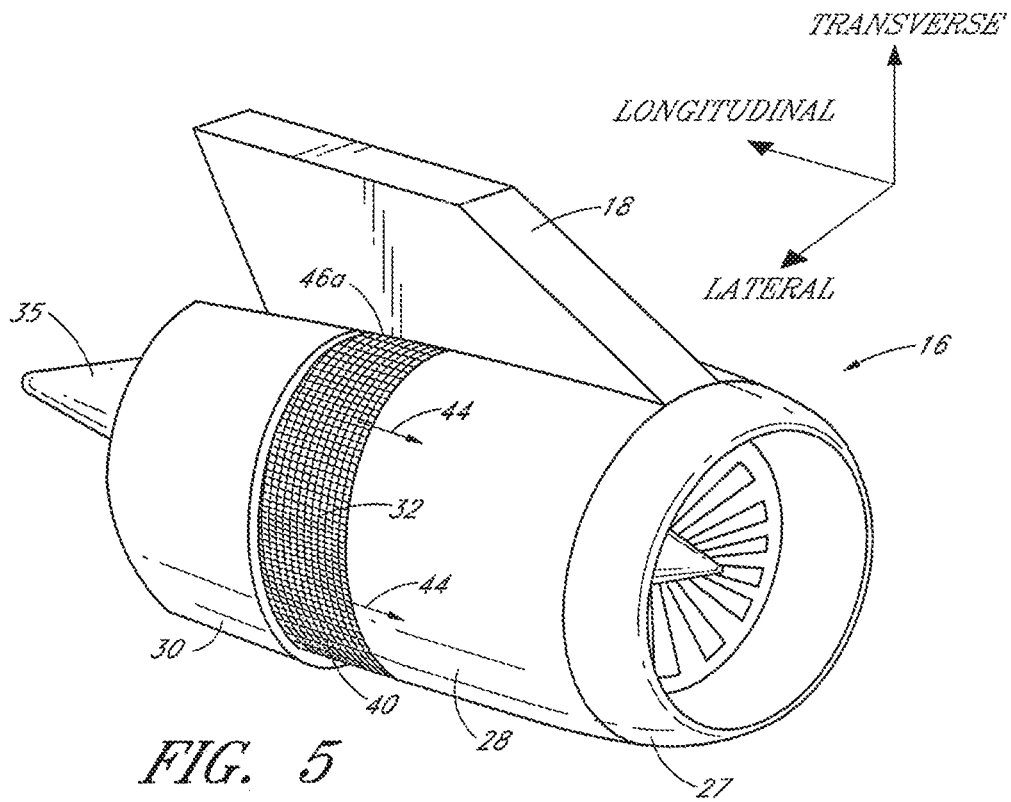
FIG. 5 is a perspective view of the nacelle of FIG. 1 in a reverse thrust configuration.
Figure 6:
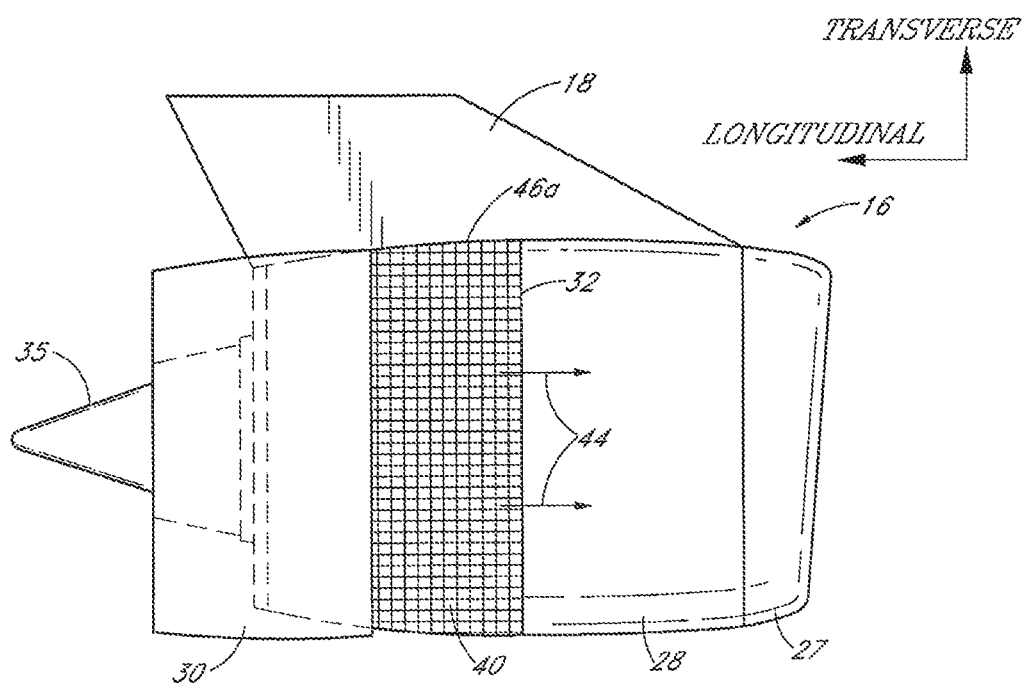
FIG. 6 is a side view of the nacelle of FIG. 5.
Figure 7:
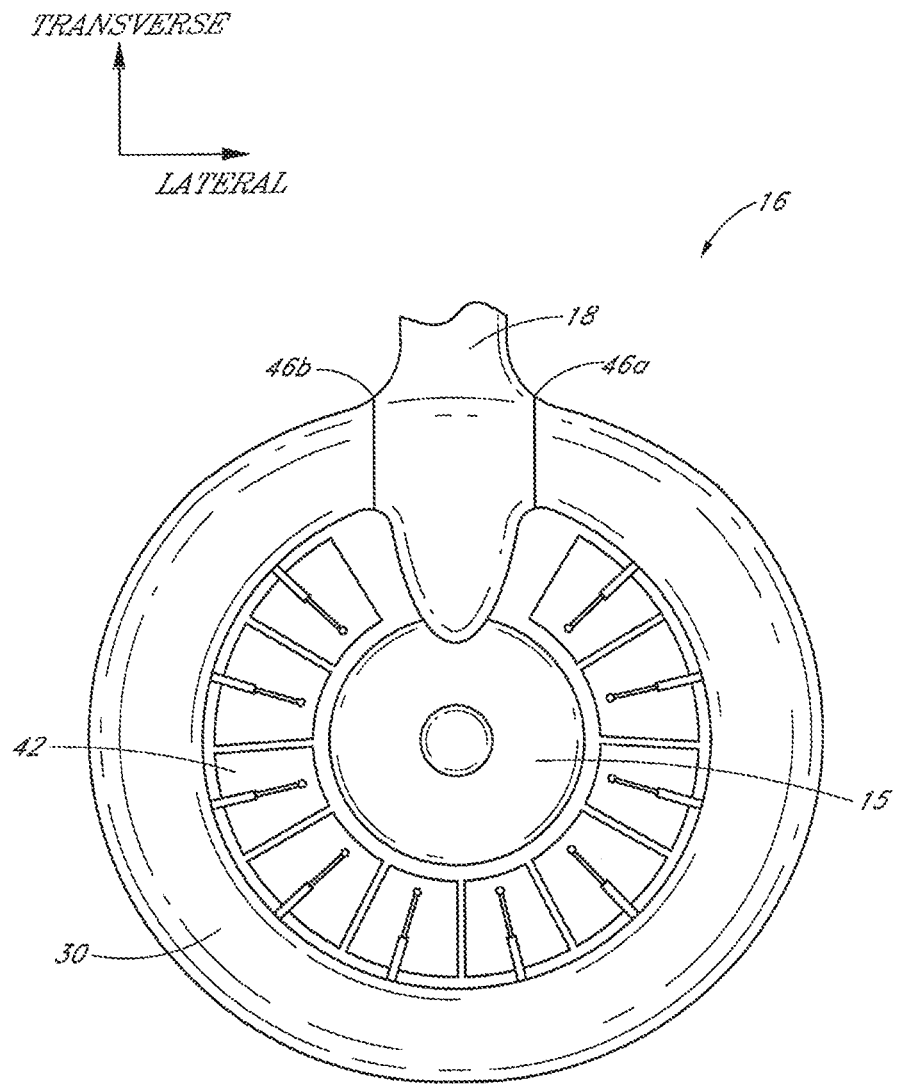
FIG. 7 is a rear view of the nacelle and engine of FIG. 5 in the reverse thrust configuration.

FIGS. 5 and 6 are a perspective view and a side view, respectively, of the nacelle 16 of FIG. 3 in a reverse thrust configuration. FIG. 7 is a rear view of the nacelle 16 in the reverse thrust configuration. Referring now to FIGS. 5 and 6, activating a reverse thrust configuration translates the outlet cowling 30 longitudinally aft from the inlet cowling 28 as compared with the position of the outlet cowling 30 in the forward thrust configuration (for example, as compared with the position of the outlet cowling 30 illustrated above in FIGS. 3 and 4). In this embodiment, the outlet cowling 30 is formed of one unitary or homogenous portion that extends continuously around the nacelle 16 from a first, outboard longitudinal split 46a to a second, inboard longitudinal split 46b (see FIG. 7). In other embodiments, the outlet cowling 30 is formed of two or more portions that, together, extend around the nacelle 16 from first split 46a to second split 46b. Activating the reverse thrust configuration moves the entire outlet cowling 30 in the longitudinal direction from a first position to a second position aft of the first position. In some aspects, the outlet cowling 30 translates about two feet aft. The longitudinal movement of the outlet cowling 30 may be guided by the longitudinal split 46a between the outlet cowling 30 and pylon 18. Such longitudinal movement of the outlet cowling 30 acts to expand the transverse split 32 disposed between the inlet cowling 28 and the outlet cowling 30 and exposes an underlying cascade 40.

The cascade 40 can include a plurality of vanes disposed circumferentially about the longitudinal axis of the nacelle 16. The vanes can redirect a flow of air from within the nacelle 16 through a lattice of the cascade 40 such that the flow of bypass air 38 exits the cascade 40 and produces a reverse thrust. Additionally, as shown in FIG. 7, as the outlet cowling 30 moves aft, blocker doors 42 are activated to impede (for example, to prevent, inhibit, or reduce) the flow of air that bypasses the engine 15 from passing through the outlet 26 of the nacelle 16. That is to say, the blocker doors 42 are activated to impede the flow of air through an air pathway defined between the inlet 19 and the outlet 26 of the nacelle 16. Instead of passing through the outlet 26, the majority of the bypass air flow 38 is diverted by the blocker doors 42 to pass through the cascade 40. The cascade 40, including a plurality of vanes and a lattice, acts to shape this flow of air such that a reverse thrust air flow 44 exits the cascade 40 in a direction toward the inlet cowling 28 as illustrated in FIGS. 5 and 6. In contrast, when in the forward thrust configuration, the outlet 26 of the nacelle 16 is substantially unimpeded by blocker doors 42 such that the engine exhaust 39 and bypass air 38 may freely exit the nacelle 16 through an air pathway or duct from the inlet 19 to the outlet 26 of the nacelle 16.

Figure 8:
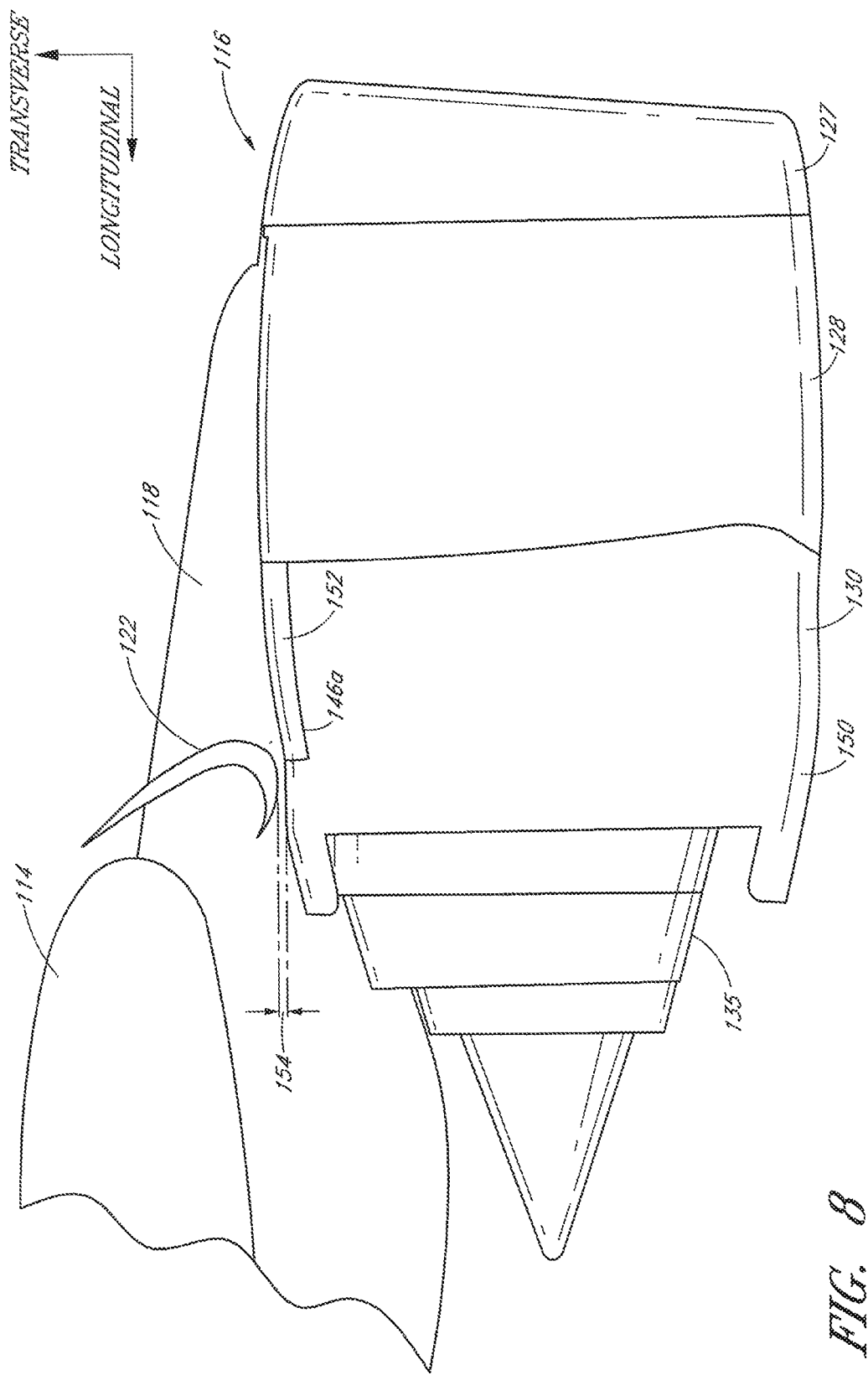
FIG. 8 is a side view of a nacelle according to another embodiment of the present invention in a forward thrust configuration.

FIG. 8 illustrates a side view of a nacelle 116 in accordance with one embodiment of the present invention. The nacelle 116 is coupled to a wing 114 by a pylon 118. The wing 114 includes a leading edge slat 122 configured to move between a stowed position and a deployed position which is illustrated in FIG. 8. The nacelle 116 includes a noselip 127, an inlet cowling 128, an outlet cowling 130, and an exhaust nozzle 135. The nacelle 116 also includes a cascade 140 underneath (that is, disposed radially inward of) a portion of the outlet cowling 130. In FIG. 8, the nacelle 116 is in a forward thrust configuration, such that the outlet cowling 130 is in a first position, stowed adjacent to the inlet cowling 128. The outlet cowling 130 includes an outer translating sleeve 150 and an outer fixed (i.e., non-translating) structure 152. The nacelle 116 also includes an outboard longitudinal split 146a between the outer translating sleeve 150 and the outer fixed structure 152.

The leading edge slat 122 can come into close proximity with the outlet cowling 130 when the leading edge slat 122 is deployed downward toward the nacelle 116. As described above with reference to FIGS. 3-6, a reverse thrust condition deploys the outlet cowling 130 in the aft direction and engages blocker doors to temporarily divert air in the forward direction. In aspects where activating a reverse thrust configuration moves the entire outlet cowling in the aft direction from a stowed position (for example, as with outlet cowling 30 of nacelle 16 illustrated in FIG. 5), the present invention insures that the outlet cowling does not slide into and come into contact with the deployed leading edge slat 122. Such contact could prevent the outlet cowling 130 from moving aft to a fully deployed position because of interference with the deployed leading edge slat 122. Such interference could cause damage to the outlet cowling 130, the leading edge slat 122, and other structures in the wing 114 and the nacelle 116.

In one aspect of the present invention, the outlet cowling 130 includes an outer translating sleeve 150 configured to move longitudinally in the aft direction when the reverse thrust configuration is activated. The outer translating sleeve 150 can move longitudinally from a first position to a second position aft of the first position. The outlet cowling 130 also includes an outer fixed structure 152 located between the outer translating sleeve 150 and the pylon 118. As described in greater detail with reference to FIGS. 9 and 10 below, the outer fixed structure 152 is fixed in place and does not move longitudinally in the aft direction when the reverse thrust configuration is engaged. As a result, the outer fixed structure 152 does not come into contact with the deployed leading edge slat 122.

Figure 9A:
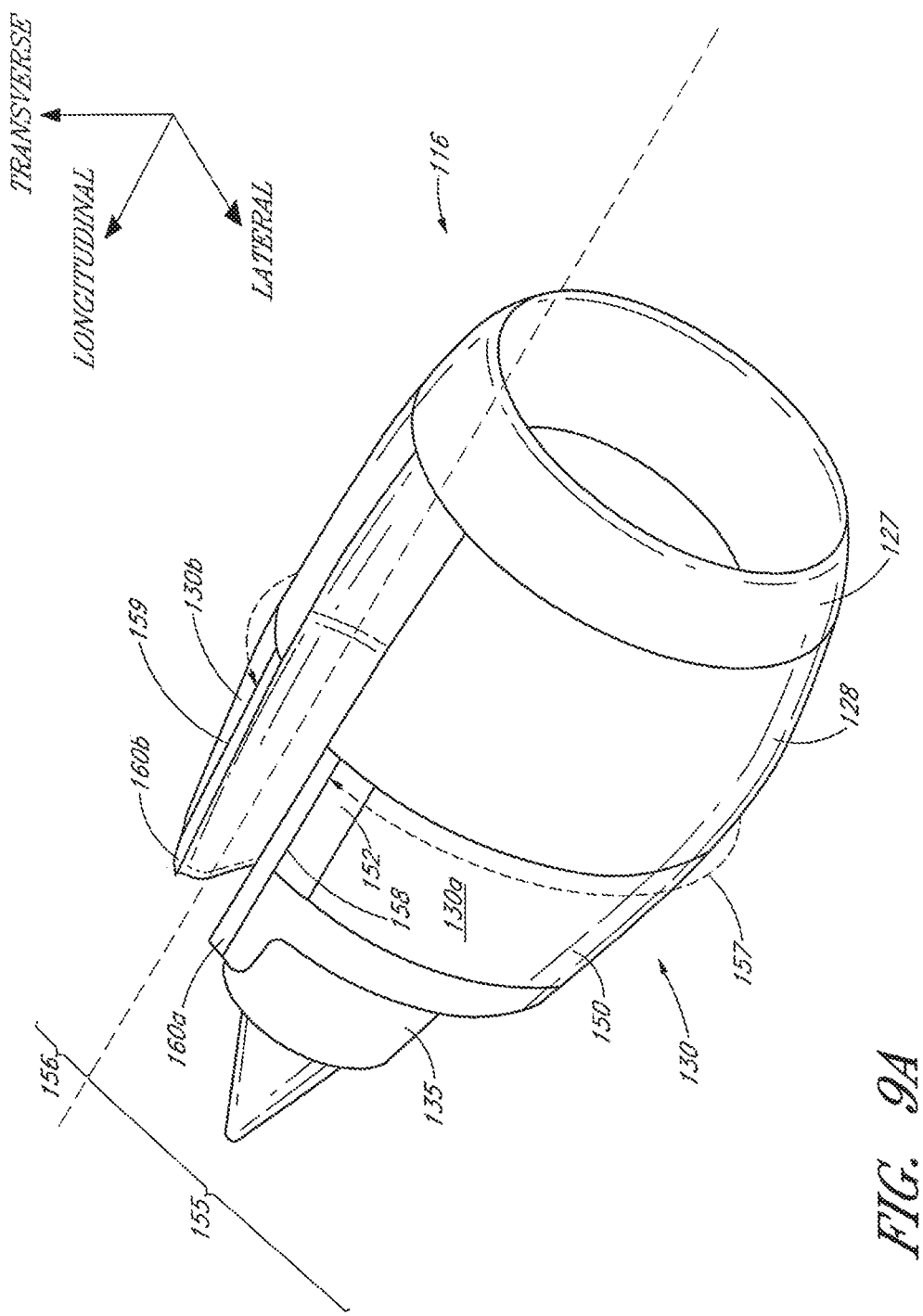
FIG. 9A is a perspective view of the nacelle of FIG. 8.

FIG. 9A is a perspective view of the nacelle 116 of FIG. 8, without schematic depictions of the pylon 118, the wing 119, or the leading edge slat 122. The outlet cowling 130 has a circumferential length 157 measured from an outboard top edge 158 to an inboard top edge 159. As described above, the outlet cowling 130 includes an outer translating sleeve 150 and an outer fixed structure 152. The outer fixed structure 152 is located along the circumferential length 157 of the outlet cowling 130 between the outboard top edge 158 and the outer translating sleeve 150. The outer translating sleeve 150 extends circumferentially from the outer fixed structure 152 to the inboard top edge 159. The outer fixed structure 152 extends circumferentially the distance needed to prevent the outlet cowling 130 that surrounds it from striking the deployed slat when the outlet cowling 130 is translated aft into a deployed position.

A geometric plane formed by the transverse and longitudinal axes of the nacelle 116 defines an outboard portion 155 and an inboard portion 156 of the nacelle 116. In certain embodiments, the outer fixed structure 152 is longitudinally aligned with the outboard portion 155 of the nacelle 116, between an outboard portion 130a of the outlet cowling 130 and the pylon 118. The nacelle 116 may, but need not, include an outer fixed structure in an inboard portion 156 of the nacelle 116.

The outer fixed structure 152 can be located outboard of a first hinge access panel 160a such that the outer fixed structure 152 is further away from the plane formed by the transverse and longitudinal axes than the first hinge access panel 160a. Additionally, an inboard portion 130b of the outlet cowling 130 can be located inboard of a second hinge access panel 160b such that the inboard portion 130b is located further away from the plane formed by the transverse and longitudinal axes than the second hinge access panel 160b.

Embodiments of the present invention are not limited to an outer fixed structure 152 that is located in the outboard portion 155 of the nacelle 116. Embodiments can also include a plurality of outer fixed structures disposed circumferentially around the upperside of the nacelle 116 to avoid contact between the outlet cowling 130 and the leading edge slat 122 when one or both are deployed in a reverse thrust configuration.

Figure 9B:
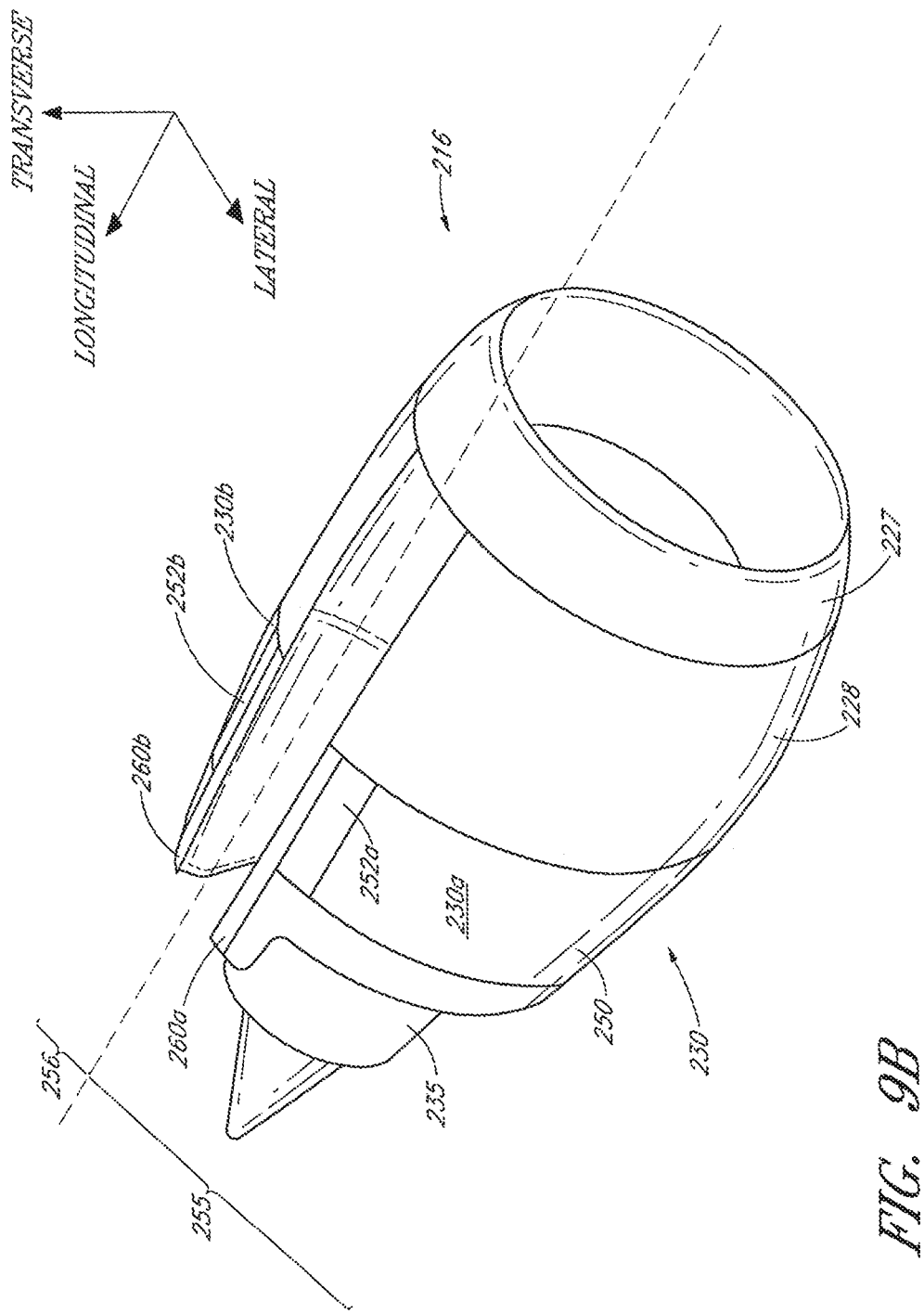
FIG. 9B is a perspective view of a nacelle according to yet another embodiment of the present invention in a forward thrust configuration.

FIG. 9B is a perspective view of a nacelle 216 according to another embodiment in which the nacelle 216 includes an outlet cowling 230 having a plurality of outer fixed structures. The outlet cowling 230 includes two outer fixed structures, a first outer fixed structure 252a located in an outboard portion 255 of the nacelle 216, and a second outer fixed structure 252b located in an inboard portion 256 of the nacelle 216. The second outer fixed structure 252b can be disposed, for example, between an inboard portion 230b of the outlet cowling 230 and a second hinge access panel 260b. The second outer fixed structure 252b does not move longitudinally when the outlet cowling 230 is moved aft during reverse thrust, and can be configured to avoid contact between a portion of a deployed leading edge slat 222 located above the second outer fixed structure 252b.

Figure 10:
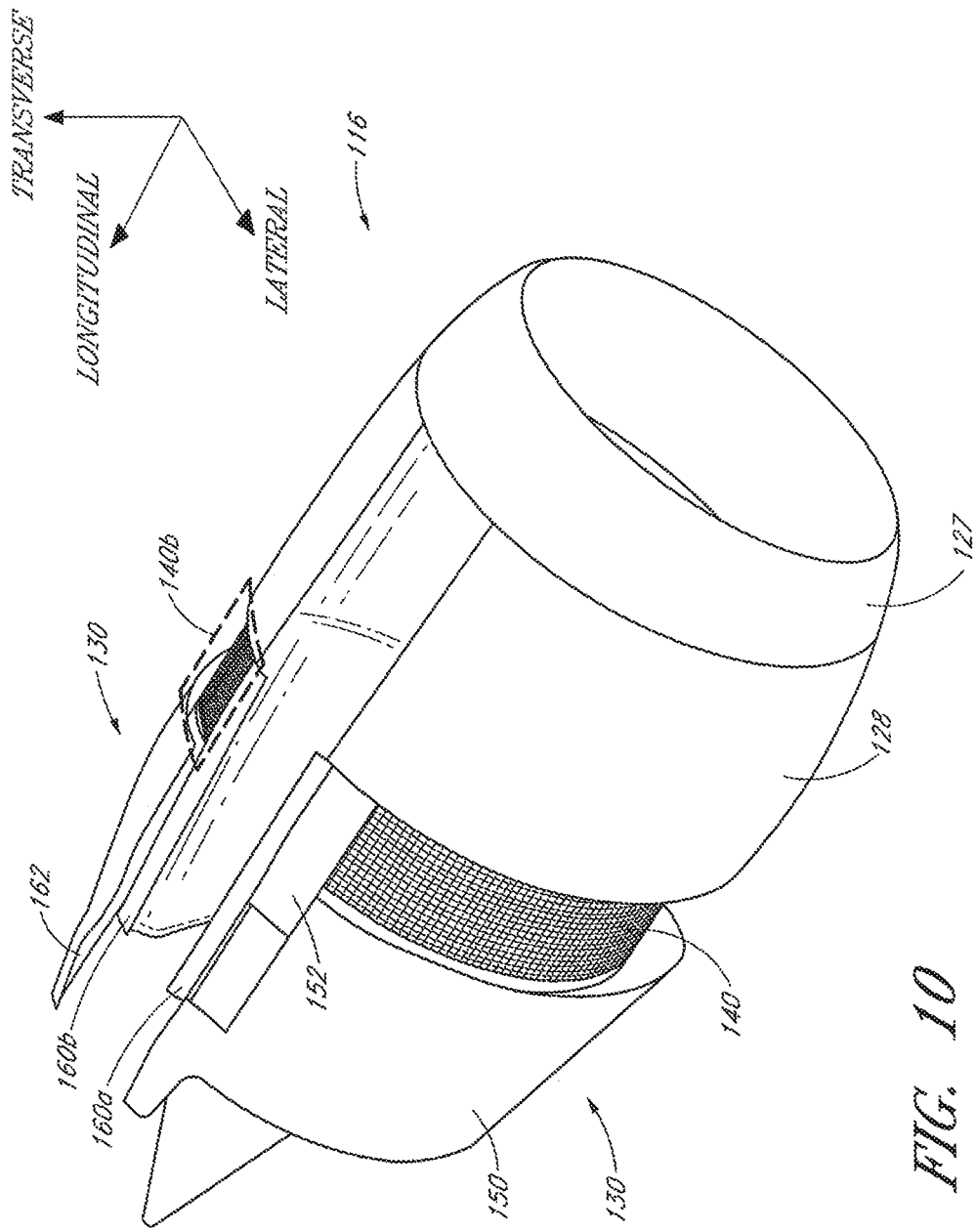
FIG. 10 is a perspective view of the nacelle of FIG. 8 in a reverse thrust configuration.

FIG. 10 is a perspective view of the nacelle 116 of FIGS. 8 and 9A in a reverse thrust configuration. The outer translating sleeve 150 of the outlet cowling 130 has moved longitudinally from the first position, stowed adjacent to the inlet cowling 128, to a second position aft of the first position. The outlet cowling 130 also includes an inner translating sleeve 162 that also moves longitudinally aft with activation of the reverse thrust configuration. In one aspect, the outer translating sleeve 150 moves in conjunction with the inner translating sleeve 162 such that both sleeves move aft when reverse thrust is engaged. For example, the outer translating sleeve 150 can be mechanically coupled or unitary with the inner translating sleeve 162 such that the outer translating sleeve 150 moves in conjunction with the inner translating sleeve 162. The movement of the outer translating sleeve 150 in the aft direction to the second position exposes the cascade 140, allowing redirected air to exit the cascade 140 and contribute to reverse thrust for the aircraft.

The outer fixed structure 152, which is located closest to the deployed leading edge slat 122, does not move with activation of the reverse thrust configuration. The clearance between the leading edge slat 122 when deployed and the outer fixed structure 152 does not change. Because the outlet cowling 130 does not extend into the region of the outer fixed structure 152 and instead is located farther away from the deployed leading edge slat 122 than the outer fixed structure 152, the outlet cowling 130 does not collide with the deployed leading edge slat 122 when it moves in the aft direction.

In the embodiment illustrated in FIG. 10, an inboard portion 140b of the cascade 140 is exposed when the outer translating sleeve 150 is moved aft in a reverse thrust configuration. Redirected air can exit the cascade 140 through the now-exposed inboard portion 140b, whereas air cannot be redirected out of the cascade 140 through the outer fixed structure 152.

Figure 11:
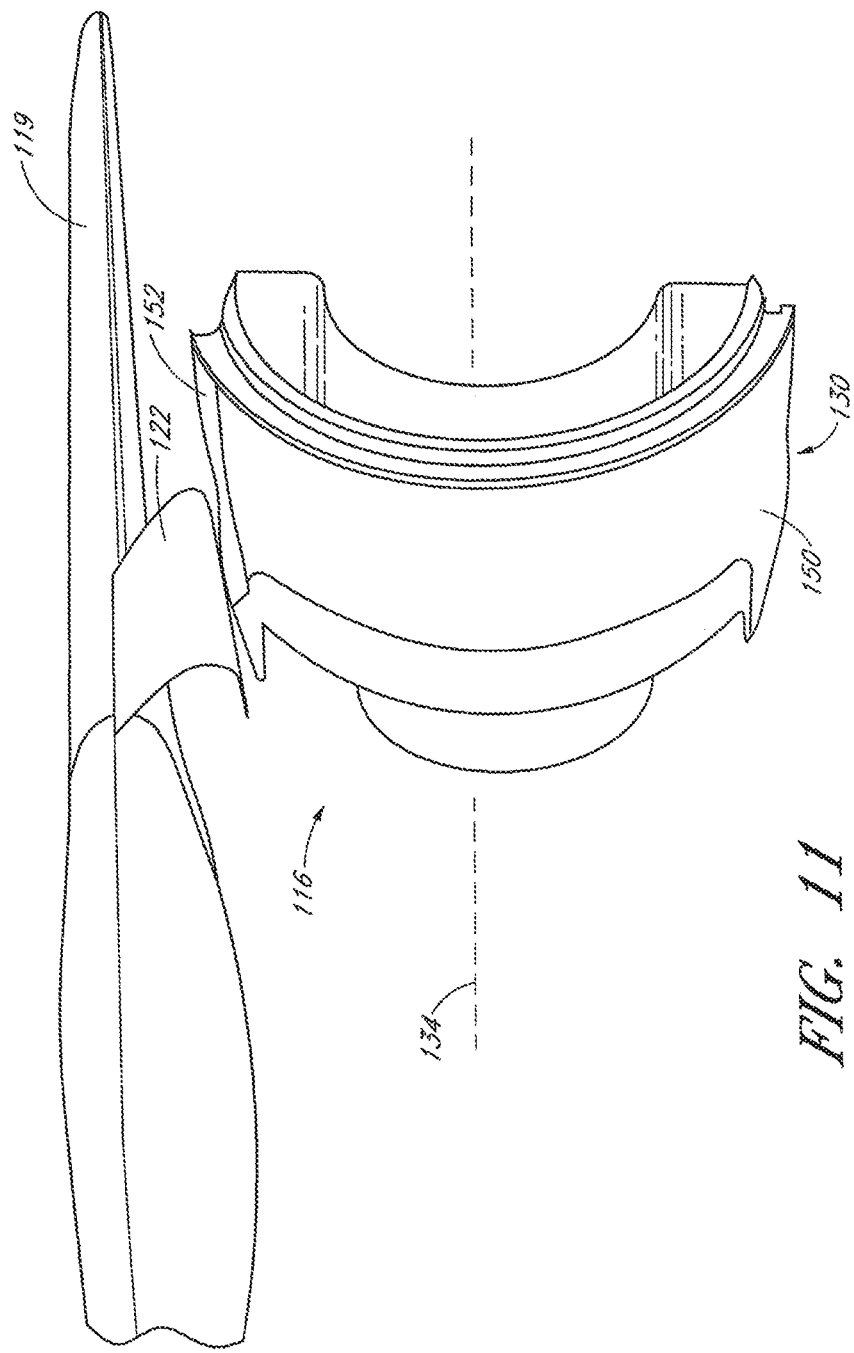
FIG. 11 is a perspective cut-away view of a portion of the nacelle of FIG. 8 in a forward thrust configuration.

FIG. 11 is a perspective cut-away view of a portion of the nacelle 116 of FIG. 8 in a forward thrust configuration. The nacelle 116 is coupled to a wing 119 having a leading edge slat 122. The nacelle 116 includes the outlet cowling 130 and an inlet cowling (not illustrated in FIG. 11). The leading edge slat 122 has moved from a first, stowed position to a second, deployed position just above the nacelle 116. The nacelle 116 is in a forward thrust configuration, with the outlet cowling 130 in a first position, stowed adjacent to the inlet cowling. The outlet cowling 130 includes a first portion, an outer translating sleeve 150, configured to move longitudinally from the first position to a second position aft of the first position. In some aspects, the outer translating sleeve 150 moves aft in a longitudinal direction substantially parallel to a longitudinal axis 134 of the nacelle 116. The outlet cowling 130 also includes a second portion, an outer fixed structure 152, that is configured to remain stationary when the outer translating sleeve 150 moves aft to the second position. The deployed leading edge slat 122 is located just above the outer fixed structure 152, but because longitudinal movement of the outer fixed structure 152 in the aft direction does not take place, as described above, the outer fixed structure 152 does not collide or otherwise interfere with the deployed leading edge slat 122.

Figure 12:
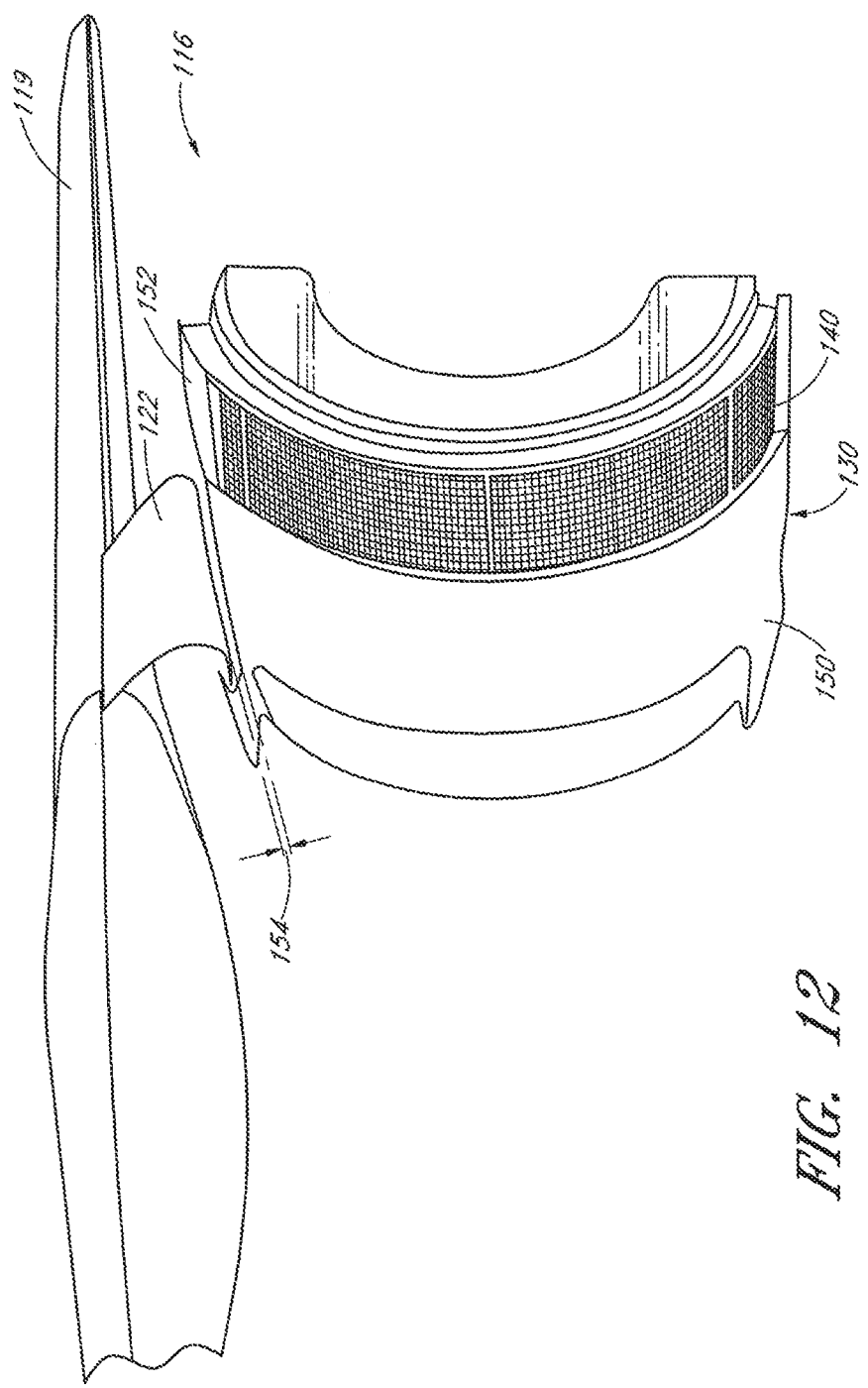
FIG. 12 is a perspective cut-away view of a portion of the nacelle of FIG. 8 in a reverse thrust configuration.

FIG. 12 is a perspective cut-away view of a portion of the nacelle 116 of FIG. 8 in a reverse thrust configuration. The first portion of the outlet cowling 130, the outer translating sleeve 150, has moved longitudinally to a second position aft of the first position. Movement of the outer translating sleeve 150 aft reveals a cascade 140 underlying (that is, located radially inward of) the outer translating sleeve 150, allowing air redirected by activated blocker doors to exit the nacelle 116 and provide reverse thrust. A clearance distance 154 remains between the nacelle 116 and the deployed leading edge slat 122 even when the nacelle 116 is in the reverse thrust configuration. The second portion of the outlet cowling 130, the outer fixed structure 152, has not moved longitudinally in the aft direction and remains stationary above the now-exposed cascade 140. The cascade 140 preferably does not lie underneath (that is, is not located radially inward of) the outer fixed structure 152.

Figure 13:
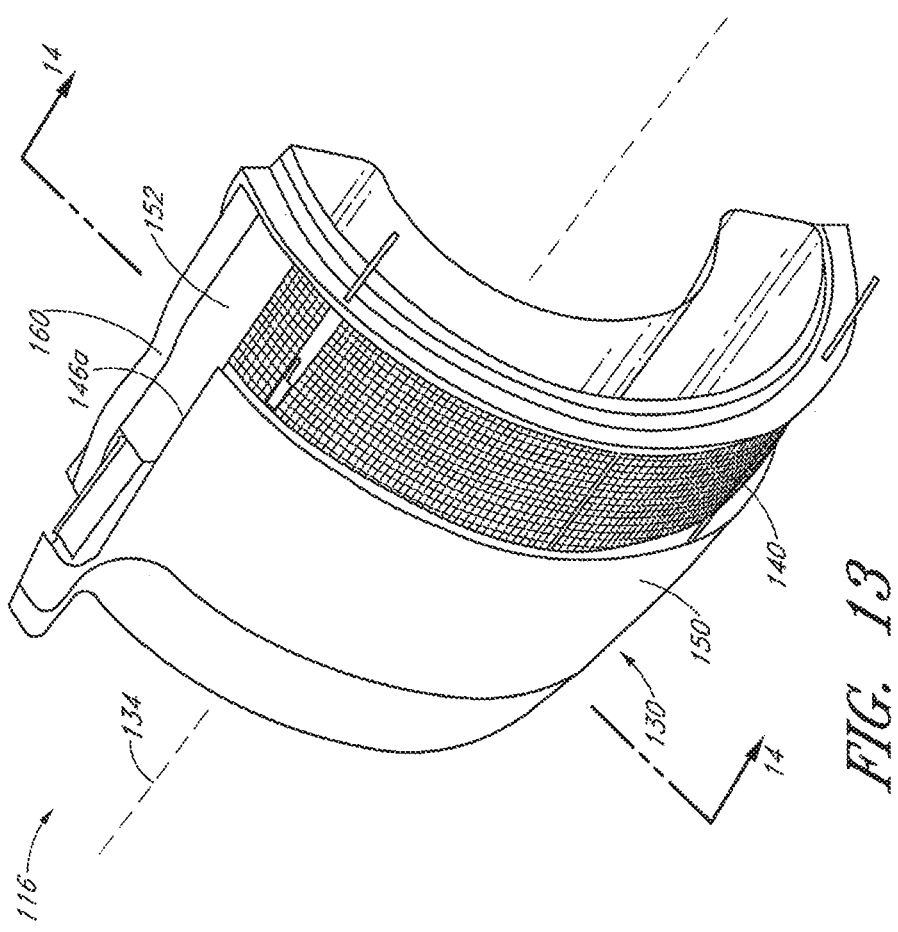
FIG. 13 is a perspective cut-away view of a portion of the nacelle of FIG. 8 in a reverse thrust configuration.

FIG. 13 is a perspective cut-away view of a portion of the nacelle 116 of FIG. 8 in a reverse thrust configuration. As described above, the nacelle 116 includes an outer translating sleeve 150 and an outer fixed structure 152. The nacelle 116 also includes a hinge access panel 160 located adjacent to and inboard of the outer fixed structure 152. The nacelle 116 is in a reverse thrust configuration, with the outer translating sleeve 150 in a second, deployed position that is longitudinally aft of a first, stowed position. In one embodiment, the outer fixed structure 152 is located between the hinge access panel 160 and a longitudinal split 146a formed between the outer translating sleeve 150 and the outer fixed structure 152. The hinge access panel 160 can allow access to internal components of the nacelle 116.

Figure 14:
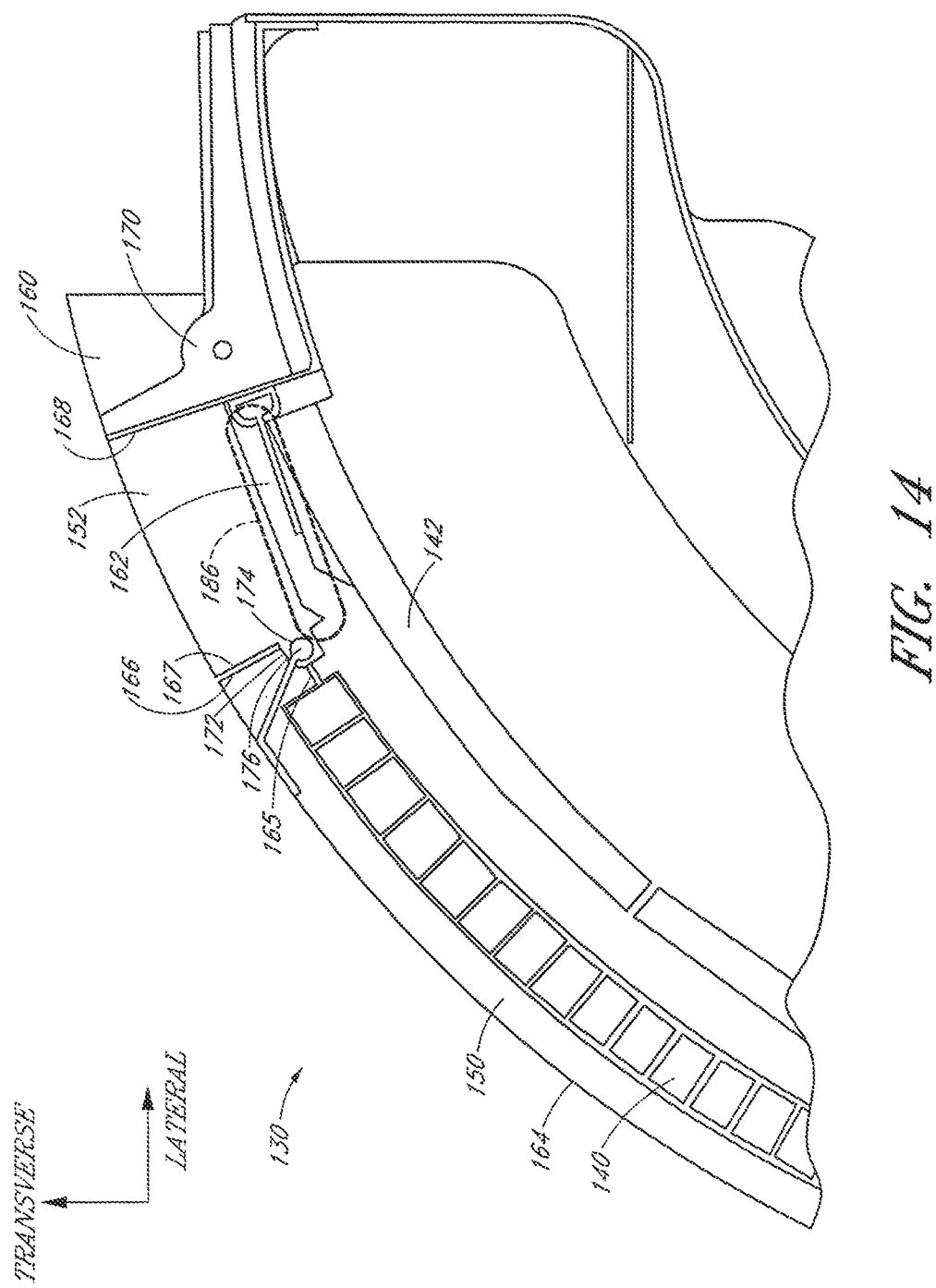
FIG. 14 is a partial cross-sectional view of the nacelle of FIG. 13 taken along line 14-14, with the nacelle shown in a forward thrust configuration.

FIG. 14 is a partial cross-sectional view of the nacelle 116 of FIG. 13 taken along line 14-14. Although the nacelle 116 of FIG. 13 is shown in a reverse thrust configuration, FIG. 14 illustrates a blocker door 142 parallel to the outer translating sleeve 150, in a forward thrust configuration. The nacelle 116 can include an inner translating sleeve 162 located radially inward of the outer translating sleeve 150 and the outer fixed structure 152. In some embodiments, activating a reverse thrust configuration moves the outer translating sleeve 150 and the inner translating sleeve 162 longitudinally from a first position adjacent to an inlet cowling to a second position aft of the first position. The outer translating sleeve 150 and the inner translating sleeve 162 may move simultaneously.

The nacelle 116 includes a plurality of blocker doors 142 radially inward of the outer fixed structure 152. Activating reverse thrust moves the blocker doors 142 in the aft direction, from a first (forward thrust) position parallel to the outer translating sleeve 150 to a second (reverse thrust) position. In some embodiments, the blocker doors in the second position are perpendicular to the outer translating sleeve 150. The nacelle 116 includes a cascade 140 configured to permit air to exit the nacelle 116 when the outer translating sleeve 150 and blocker doors 142 moves aft. The outer translating sleeve 150 is disposed radially outboard of the cascade 140, but the cascade 140 preferably does not extend circumferentially to a location underneath (that is to say, is not located radially inward of) the outer fixed structure 152. Movement of the outer translating sleeve 150 exposes the cascade 140, allowing air redirected by the blocker door 142 in the second position to exit the nacelle 116 through the cascade 140.

The outer translating sleeve 150 can include an outer transverse side 164, an inner transverse side 165, and an inboard lateral side 166. The outer fixed structure 152 can include an outboard lateral side 167 and an inboard lateral side 168. The outboard lateral side 167 of the outer fixed structure 152 is adjacent to the inboard lateral side 166 of the outer translating sleeve 150. The inboard lateral side 168 of the outer fixed structure 152 can be adjacent to an upper track beam 170. The upper track beam 170 is stationary in some aspects, and is located between the inboard lateral side 168 of the outer fixed structure 152 and the hinge access panel 160. In some aspects, the outer fixed structure 152 is coupled or attached to the upper track beam 170.

The outer fixed structure 152 can include features which guide the outer translating sleeve 150 as it moves longitudinally aft from the first position to the second position. These features can include, for example, one or more tracks, couplers, tongues, grooves, or other structures which allow the translating sleeve 150 to move or slide relative to the outer fixed structure 152. In certain embodiments, the outer fixed structure 152 includes a track along which a groove in the translating sleeve 150 slides relative to the outer fixed structure 152. In certain embodiments, the outer translating sleeve 150 and the outer fixed structure 152 include male/female features which together form a mating engagement that allows the translating sleeve 150 to move or slide relative to the outer fixed structure 152. Exemplary male and female features include tongue and groove members. The tongue member may be located on the outer fixed structure 152 or the translating sleeve 150 with the groove member being located on the other one of the outer fixed structure 152 and the translating sleeve 150. Of course the invention is not limited to the disclosed arrangements of features and further includes other mechanical structures known to a person having ordinary skill in the art that would allow the translating sleeve 150 to move or slide relative to the outer fixed structure 152.

In one aspect, the outboard lateral side 167 of the outer fixed structure 152 includes an outer track 172. The outer track 172 can extend the length of the outer fixed structure 152 in the longitudinal direction. The outer track 172 includes a groove 174. The groove 174 accepts a mating tongue 176 of the outer translating sleeve 150. In one embodiment, the mating tongue 176 is disposed adjacent to the inner transverse side 165 and the inboard lateral side 166 of the outer translating sleeve 150. The tongue 176 is not limited to this location, however, and can be disposed in other positions, for example on the inboard lateral side 166 of the outer translating sleeve 150. The tongue 176 and the groove 174 form a mating engagement in which the tongue 176 slides longitudinally aft within the groove 174 when the outer translating sleeve 150 moves longitudinally aft. Other mating engagements between the outer translating sleeve 150 and the outer fixed structure 152 are within the scope of the present invention.

Nacelles described herein can advantageously include a mating engagement between an outer translating sleeve and an outer fixed structure without affecting operation of an inner translating sleeve. In one aspect, for example, the inner translating sleeve 162 moves longitudinally in the aft direction when the outer translating sleeve 150 moves longitudinally in the aft direction. A portion 186 of the inner translating sleeve 162 is located radially inward of the outer fixed structure 152. That is to say, the portion 186 is located closer to the longitudinal axis 134 of the nacelle 116 than the outer fixed structure 152. When the inner translating sleeve 162 moves aft to the reverse thrust configuration according to one embodiment, the portion 186 moves aft underneath the outer fixed structure 152 while the outer fixed structure 152 remains stationary. Movement of the portion 186 underneath the outer fixed structure 152 can advantageously allow a sufficient amount of a fan duct in the nacelle 116 to be blocked off by the blocker door 142 to meet performance requirements. Accordingly, embodiments of nacelles described herein can incorporate an outlet cowling that does not contact a deployed leading edge slat when the nacelle is placed in a reverse thrust configuration, without modifying the structure or operation of an inner translating sleeve of the outlet cowling.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by any presented claims rather than by the foregoing description. All variations coming within the meaning and range of equivalency of presented claims are embraced within their scope.

What is claimed is:

1. A nacelle comprising a cascade and an outlet cowling, the cascade being radially inward relative to the outlet cowling, the outlet cowling comprising:
   a translating sleeve panel comprising an aft end and a first lateral side;
   an outer fixed structure, the outer fixed structure comprising a first lateral side;
   an outer track on the first lateral side of the outer fixed structure;
   a forward thrust configuration where the aft end of the translating sleeve panel is in a first position relative to the outer fixed structure; and
   a reverse thrust configuration where the aft end of the translating sleeve panel is in a second position relative to the outer fixed structure, wherein the second position is longitudinally aft of the first position, wherein the translating sleeve panel slides along the outer track in moving between the forward thrust configuration and the reverse thrust configuration, and wherein the translating sleeve panel is configured to expose the cascade in response to translating aftward to the reverse thrust configuration, thereby allowing air to be redirected in a forward direction via the cascade in the reverse thrust configuration,
   wherein the first lateral side of the translating sleeve panel is adjacent to the first lateral side of the outer fixed structure,
   wherein the translating sleeve panel is configured to translate longitudinally aftward relative to the outer fixed structure via the outer track in moving from the forward thrust configuration to the reverse thrust configuration.

2. The nacelle of claim 1, further comprising an inner translating sleeve panel that is located radially inward from the translating sleeve panel and forms a cavity between the translating sleeve panel and the inner translating sleeve panel.

3. The nacelle of claim 2, further comprising a groove in the outer fixed structure that forms the outer track and is configured to receive a slider that is attached to the translating sleeve panel.

4. The nacelle of claim 3, wherein the outer fixed structure extends into the cavity between the translating sleeve panel and the inner translating sleeve panel.

5. The nacelle of claim 3, wherein the translating sleeve panel further comprises an outer transverse side and an inner transverse side, wherein the outer transverse side is radially outward of the inner transverse side, and wherein the slider of the translating sleeve panel is attached to the inner transverse side of the translating sleeve panel and disposed adjacent to the first lateral side of the outer fixed structure.

6. The nacelle of claim 1, wherein the outer track extends a length of the outer fixed structure in a longitudinal direction.

7. The nacelle of claim 1, wherein the outer fixed structure further comprises a hinge access panel adjacent to the outer fixed structure, wherein the second lateral side of the outer fixed structure is closer to a nacelle pylon than the first lateral side of the outer fixed structure in an installed configuration for the outlet cowling.

8. The nacelle of claim 5, wherein the cascade is radially inward of the outer transverse side of the translating sleeve panel in the cavity between the translating sleeve panel and the inner translating sleeve panel, wherein the translating sleeve panel and the inner translating sleeve panel are configured to expose the cascade in response to translating aftward, thereby allowing air to be redirected in the forward direction via the cascade.

9. A nacelle comprising:
   a cascade;
   an inlet cowling;
   an outlet cowling separated from the inlet cowling by a transverse split line, the cascade being radially inward relative to the outlet cowling, the outlet cowling including:
      a translating sleeve panel comprising an aft end and a first lateral side; and
      an outer fixed structure comprising a track and a first lateral side adjacent to the first lateral side of the translating sleeve panel;
   a forward thrust configuration where the aft end of the translating sleeve panel is in a first position relative to the outer fixed structure; and
   a reverse thrust configuration where the aft end of the translating sleeve panel is in a second position relative to the outer fixed structure, wherein the second position is longitudinally aft of the first position, wherein the outer fixed structure remains in the same position for each of the forward thrust configuration and the reverse thrust configuration, and wherein the translating sleeve panel slides along the track in moving between the forward thrust configuration and the reverse thrust configuration;
   wherein the translating sleeve panel is configured to expose the cascade in response to translating longitudinally aftward relative to the outer fixed structure via the track in moving from the forward thrust configuration to the reverse thrust configuration, thereby allowing air to be redirected in a forward direction via the cascade.

10. The nacelle of claim 9, wherein the outlet cowling further comprises an inner translating sleeve panel that is located radially inward from the translating sleeve panel and forms a cavity between the translating sleeve panel and the inner translating sleeve panel.

11. The nacelle of claim 9, further comprising a groove in the outer fixed structure that forms the track and is configured to receive a slider that is attached to the translating sleeve panel.

12. The nacelle of claim 10, wherein the outer fixed structure extends into the cavity between the translating sleeve panel and the inner translating sleeve panel.

13. The nacelle of claim 11, wherein the translating sleeve panel further comprises an outer transverse side and an inner transverse side, wherein the outer transverse side is radially outward of the inner transverse side, and wherein the slider of the translating sleeve panel is attached to the inner transverse side of the translating sleeve panel and disposed adjacent to the first lateral side of the outer fixed structure.

14. The nacelle of claim 9, further comprising a pylon, wherein the track is on the first lateral side of the outer fixed structure, wherein the track extends a length of the outer fixed structure in a longitudinal direction, and wherein the outer fixed structure is located between the pylon and the translating sleeve.

15. The nacelle of claim 9, wherein the outer fixed structure further comprises a hinge access panel adjacent to the outer fixed structure.

16. The nacelle of claim 13, wherein the cascade is radially inward of the outer transverse side of the translating sleeve panel in the cavity between the translating sleeve panel and the inner translating sleeve panel, wherein the translating sleeve panel and the inner translating sleeve panel are configured to expose the cascade in response to translating aftward in moving from the forward thrust configuration to the reverse thrust configuration, thereby allowing air to be redirected in the forward direction via the cascade.

17. A method of reversing thrust of an engine fitted with a nacelle on an aircraft, the nacelle comprising an outlet cowling, wherein the outlet cowling comprises a translating sleeve panel, an inner translating sleeve panel, and an outer fixed structure, the method comprising:
  changing the outlet cowling from a forward thrust configuration to a reverse thrust configuration, comprising moving the translating sleeve panel and the inner translating sleeve panel longitudinally from a first position corresponding with the forward thrust configuration to a second position corresponding with the reverse thrust configuration without moving the outer fixed structure, wherein the second position is aft of the first position, wherein the translating sleeve panel is configured to move relative to the outer fixed structure by translating along a track on the outer fixed structure;
  exposing a cascade with the outlet cowling being in the reverse thrust configuration; and
  redirecting air within the nacelle and through the cascade in a direction that produces a reverse thrust with the outlet cowling being in the reverse thrust configuration.

18. The method of claim 17, wherein the outer track includes a groove configured to accept a mating tongue of the translating sleeve panel, and wherein the outer fixed structure is located between a pylon and the translating sleeve, wherein the pylon interconnects the nacelle with a wing of the aircraft.

19. The method of claim 18, wherein the mating tongue is disposed adjacent to an inner transverse side and a first lateral side of the translating sleeve panel, wherein the outer first structure comprises a first lateral side and a second lateral side, wherein the second lateral side of the outer fixed structure is closer to the pylon than the first lateral side of the outer fixed structure, and wherein the first lateral side of the translating sleeve panel is adjacent to the first lateral side of the outer fixed structure.

20. The method of claim 19, wherein the groove is disposed adjacent to the first lateral side of the outer fixed structure.

* * * * *

UNITED STATES PATENT AND TRADEMARK OFFICE
CERTIFICATE OF CORRECTION

PATENT NO. : 10,968,864 B2  
APPLICATION NO. : 16/553939  
DATED : April 6, 2021  
INVENTOR(S) : Michael Ray Aten Page 1 of 1

It is certified that error appears in the above-identified patent and that said Letters Patent is hereby corrected as shown below:

On the Title Page

Item (74), Attorney, Agent or Firm field: after Snell &, please delete "Wikner" and insert --Wilmer--

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*